(12) United States Patent
Koppol

(10) Patent No.: US 7,280,534 B2
(45) Date of Patent: Oct. 9, 2007

(54) MANAGED IP ROUTING SERVICES FOR L2 OVERLAY IP VIRTUAL PRIVATE NETWORK (VPN) SERVICES

(75) Inventor: Pramod V. Koppol, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 876 days.

(21) Appl. No.: 10/717,151

(22) Filed: Nov. 19, 2003

(65) Prior Publication Data

US 2005/0105519 A1    May 19, 2005

(51) Int. Cl.
*H04L 12/66* (2006.01)
*H04L 12/28* (2006.01)
(52) U.S. Cl. ..................... 370/352; 370/392
(58) Field of Classification Search .......... 370/352, 370/392
See application file for complete search history.

(56) References Cited

U.S. PATENT DOCUMENTS 7,072,346 B2 *    7/2006    Hama ................. 370/395.53

\* cited by examiner

*Primary Examiner*—Chau Nguyen
*Assistant Examiner*—Marcus R Smith

(57) ABSTRACT

A method and apparatus for providing IP-VPN services for customers and service providers utilizing layer-2 point-to-point connectivity. The method and apparatus include exchanging unique loop-back addresses of customer edges (CE) between the CEs via a respective data virtual circuit therebetween, and sending IP addresses of customer networks associated with each CE to an associated IP service controller (IPSC). The associated IPSC broadcasts the IP addresses of the associated customer networks to other IPSCs, and each CE sends to an associated IPSC, a list of received loop-back addresses. Each IPSC then sends to an associated CE, customer network addresses received from other IPSCs, and each CE populates a local routing table with information mapping the customer networks with a data virtual circuit.

28 Claims, 6 Drawing Sheets

MANAGED IP ROUTING SERVICES FOR L2 OVERLAY IP VIRTUAL PRIVATE NETWORK (VPN) SERVICES

FIELD OF INVENTION

The present invention relates to virtual private network (VPN) services. More specifically, the present invention relates to providing managed IP routing services for layer-2 (L2) overlay IP VPNs.

DESCRIPTION OF THE BACKGROUND ART

A Virtual Private Network (VPN) is a cost effective and secure way of extending enterprise network resources over a shared public data network. Popular uses of VPNs are to interconnect multiple geographically dispersed sites of an enterprise (known as intranet/extranet VPN) and to provide remote users access to the enterprise resources (known as remote access VPN). The VPN functions as an overlay network that uses the public network to carry data traffic between corporate sites and users, maintaining privacy through the use of tunneling protocols and security procedures.

Two common approaches used to implement a service provider (SP) based IP-VPN are Multi-Protocol Label Switching (MPLS) and "virtual routers" (VR). The MPLS approach is articulated in an Internet protocol proposal Request for Comment (RFC) 2547 (RFC 2547) entitled "BGPIMPLS VPN'S", authored by E. Rosen and Y. Rekhter (as well as in the Internet Engineering Task Force (IETF) draft ($2^{nd}$ version) 2547bis), which is rapidly gaining acceptance in the industry.

MPLS is a widely supported method of speeding up IP-based data communications over service provider networks. MPLS utilizes routers at the ingress and egress edges of the service provider network where routing and forwarding function (i.e., tables) are implemented. Accordingly, the core network may comprise such routers (i.e., P-routers) or MPLS switches.

IP data from a customer edge (CE) device (e.g., router) is sent to an ingress provider edge (PE) router using, for example, frame relay access, where the PE router prepends one or more labels to the packet headers. The labels comprise routing information (i.e., a destination address), and the labeled packets are forwarded to the core network by the PE router (i.e., label switch router (LSR)). The core network devices (e.g., switches) examine the labels and route the packets to the egress PE router, where the labels are removed and the packets are then sent to the destination site.

Service providers implementing only ATM or Frame Relay switches in their networks are incapable of providing MPLS-like services for IP packets, since these type switches cannot process the IP packets. For example, an ATM switch processes and forwards fixed length 53-byte ATM cells, while a frame relay switch processes and forwards variable length packet frames. A service provider may upgrade the network to include IP enabled edge devices, such as ingress and egress label switch routers, but such an upgrade may be considered costly to both the service provider and the customers. Accordingly, there is a need to provide IP-VPN services for customers and service providers utilizing layer-2 point-to-point connectivity, such as ATM, frame relay, and the like, in a cost effective manner.

SUMMARY OF THE INVENTION

The disadvantages heretofore associated with the prior art, are overcome by the present invention of a method and apparatus for providing IP-VPN services for customers and service providers, illustratively, utilizing layer-2 point-to-point connectivity. The method and apparatus include exchanging unique loop-back addresses of customer edges (CE) between the CEs via a respective data virtual circuit therebetween, and sending IP addresses of customer networks associated with each CE to an associated IP service controller (IPSC). The associated IPSC broadcasts the IP addresses of the associated customer networks to other IPSCs, and each CE sends to an associated IPSC, a list of received loop-back addresses. Each IPSC then sends to an associated CE, customer network addresses received from other IPSCs, and each CE populates a local routing table with information mapping the customer networks with a data virtual circuit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a method and apparatus for providing managed IP-VPN services using existing ATM or frame relay (FR) infrastructures in compliance with RFC 2547 and IETF RFC 2547bis capabilities, which are incorporated by reference herein in their entireties. That is, the present invention provides a method and apparatus that enables a service provider (SP) having a layer-2 (L2) type infrastructure to offer BGP/MPLS-like managed VPN (Virtual Private Network) services for its customers. BGP (Border Gateway Protocol) is used for distributing routes over the backbone, while ATM or FR is used for forwarding the packets over the backbone.

The method and apparatus discussed below allow a service provider to offer such services without having to upgrade their previously deployed equipment with new routers and switches, install/upgrade new L3 edge devices, or have their respective customers upgrade their existing equipment. Rather, the present invention may be facilitated in currently installed routers and switches, or in servers coupled to the network, as discussed below in further detail. Although the invention is discussed in terms for application in ATM/FR networks, one skilled in the art will recognize that the teachings of the present invention may be implemented in other types of network environments.

Figure 1:
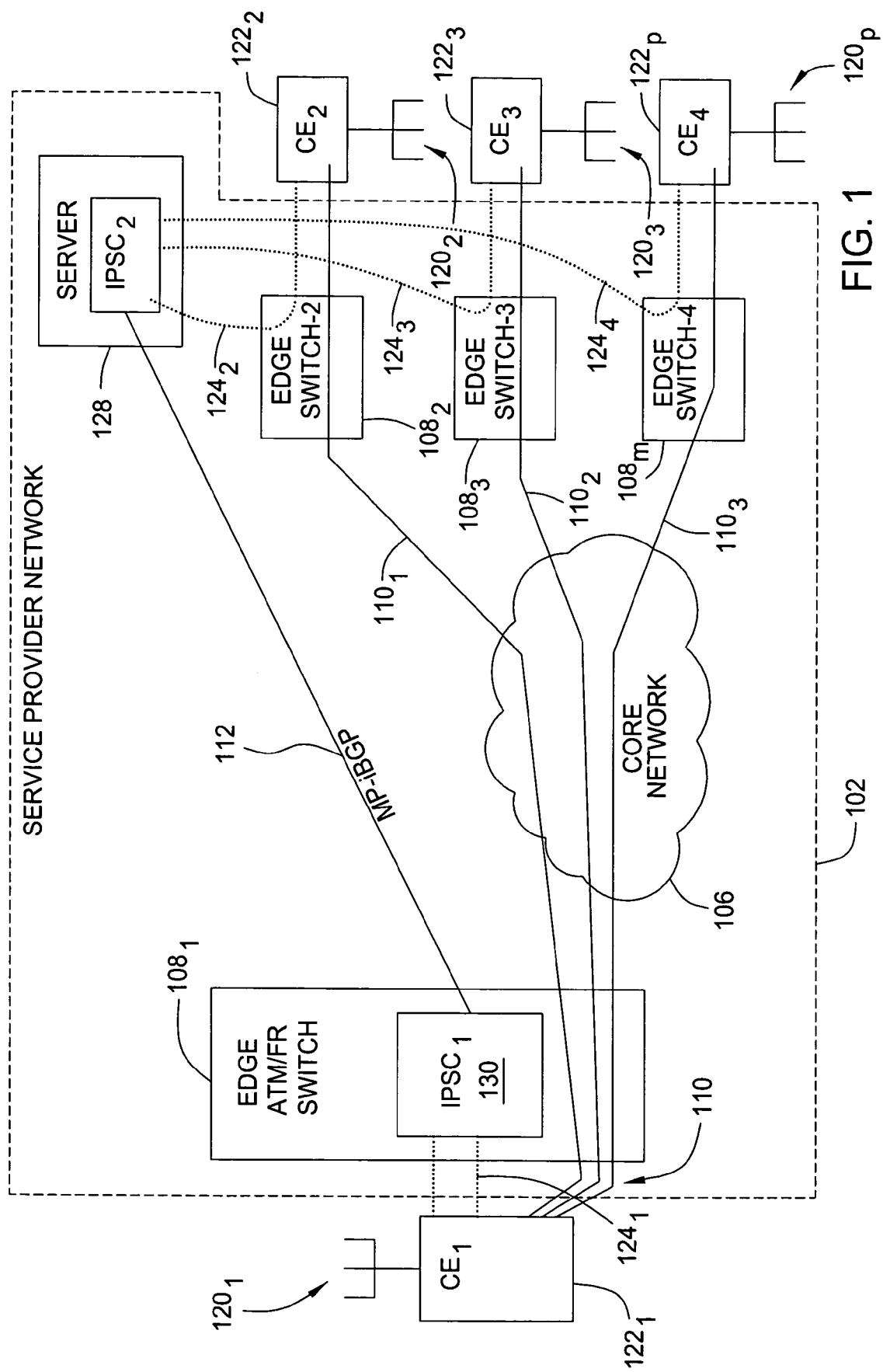
FIG. 1 depicts a schematic diagram of a first exemplary network suitable for implementing the present invention.

FIG. 1 depicts a high-level block diagram of an exemplary network 100 suitable for implementing the present invention. The network 100 comprises a service provider network 102 and a plurality of customer networks $120_1$ through $120_p$ (collectively customer networks 120). The service provider network 102 comprises a core network 106 formed by a plurality of core devices (not shown) such as ATM/FR switches, and an edge network formed by a plurality of edge ATM/FR switches $108_1$ through $108_m$ (collectively edge switches 108). The edge switches 108 are connected to the core devices of the core network 106. For purposes of understanding the invention, the exemplary network 100 is discussed in terms of an ATM infrastructure, although other embodiments contemplated herein include network infrastructures for frame relay or any other L2 type architecture, including virtual circuits.

The customer networks 120 may be intranet and/or extranet type networks, each having a "customer edge" (CE) device 122, which is connected to an edge switch 108. For example, in FIG. 1 the CE device $122_1$ is connected the edge switch $108_1$, CE device $122_2$ is connected to edge switch $108_2$, and so forth. It is noted that multiple CE devices 122 belonging to the same or different VPNs may be connected to a single edge switch 108. It is further noted that the subscripts "m" and "p" are integers greater than one.

The CE device 122 may be a router or switch, and the connection to the provider edge device 108 is identified via a layer-1 or layer-2 identifier 126. Such layer-1 or layer-2 connections may represent a physical interface ID; a virtual path/virtual circuit identifier of an Asynchronous Transfer Mode (ATM) interface; a data link connection identifier (DLCI) of a frame relay interface; or a virtual local area network identifier of an Ethernet interface, depending on the network environment.

The customer edge switches 122 are connected to other customer edge switches 122 via dedicated virtual circuits 110. In FIG. 1, a first (data) virtual circuit $110_1$ is formed between the customer edge switch $122_1$ and customer edge switch $122_2$ via devices (e.g., core switches) of the core network 106. Similarly, a second (data) virtual circuit $110_2$ is formed between the customer edge switch $122_1$ and customer edge switch $122_3$ via the core network 106, and a third (data) virtual circuit $110_3$ is formed between the customer edge switch $122_1$ and customer edge switch $122_{p=4}$ via the core network 106. The data virtual circuits (VCs) 110 may be permanent VCs (i.e., permanently defined in the routing tables in the switches or routers) or switched VCs (established across the network on an as needed basis), as required.

The backbone (i.e., core network and edge devices 108) is owned and operated by a Service Provider (SP), and the owners of the sites 120 are the "customers" of the SP. It is noted that the customers dictate the policies that determine whether a particular collection of sites form a VPN. Various techniques allow the implementation of a wide range of policies. For example, within a given VPN, every site may have a direct route to every other site ("full mesh"), or certain pairs of sites may be restricted from having direct routes to each other ("partial mesh").

Two sites have IP connectivity over a common backbone (core network) only if there is some VPN that contains them both. If two sites do not belong to a common VPN, then there is no connectivity over that backbone between the sites. In an instance where all the sites in a VPN are owned by the same enterprise, the VPN is a corporate "intranet". Alternatively, if the various sites in a VPN are owned by different enterprises, the VPN is an "extranet". A site may be included in more than one VPN, for example, in an intranet and several extranets. Both intranets and extranets are regarded as VPNs, and the term VPN is not used herein to distinguish between intranets and extranets.

Traditionally, a network management system established the virtual circuits 110, and routing information was exchanged between the CE devices 122 over the virtual circuits 110, as conventionally know in the art. In particular, the network service provider 102 was not involved in customer routing. That is, the SP network 102 merely served as a conduit for forwarding the packetized information without managing the routing therebetween. The method and apparatus of the present invention offloads the routing responsibility from the customers and places the burden of establishing the routing tables at the service provider.

In one embodiment of the present invention, the edge switch 108 comprises an IP service control (IPSC) module 130. The IPSC 130 serves as a mechanism for exchanging routing information (270 of FIG. 2) between the edge switches 108, as opposed to forwarding data. It is noted that the actual forwarding of packetized information remains the same between the edge switches 108.

Each edge switch 108 is associated with an IPSC 130. The IPSC module 130 is installed in the edge switch 108, for example, on a controller card installed in the edge switch 108. However, in an alternative embodiment, the IPSC 130 may be implemented in a server (e.g., server 118 of FIG. 1), which is connected to and supports one or more edge switches (e.g., edge switches $108_2$, $108_3$, and $108_{m=4}$).

Figure 2:
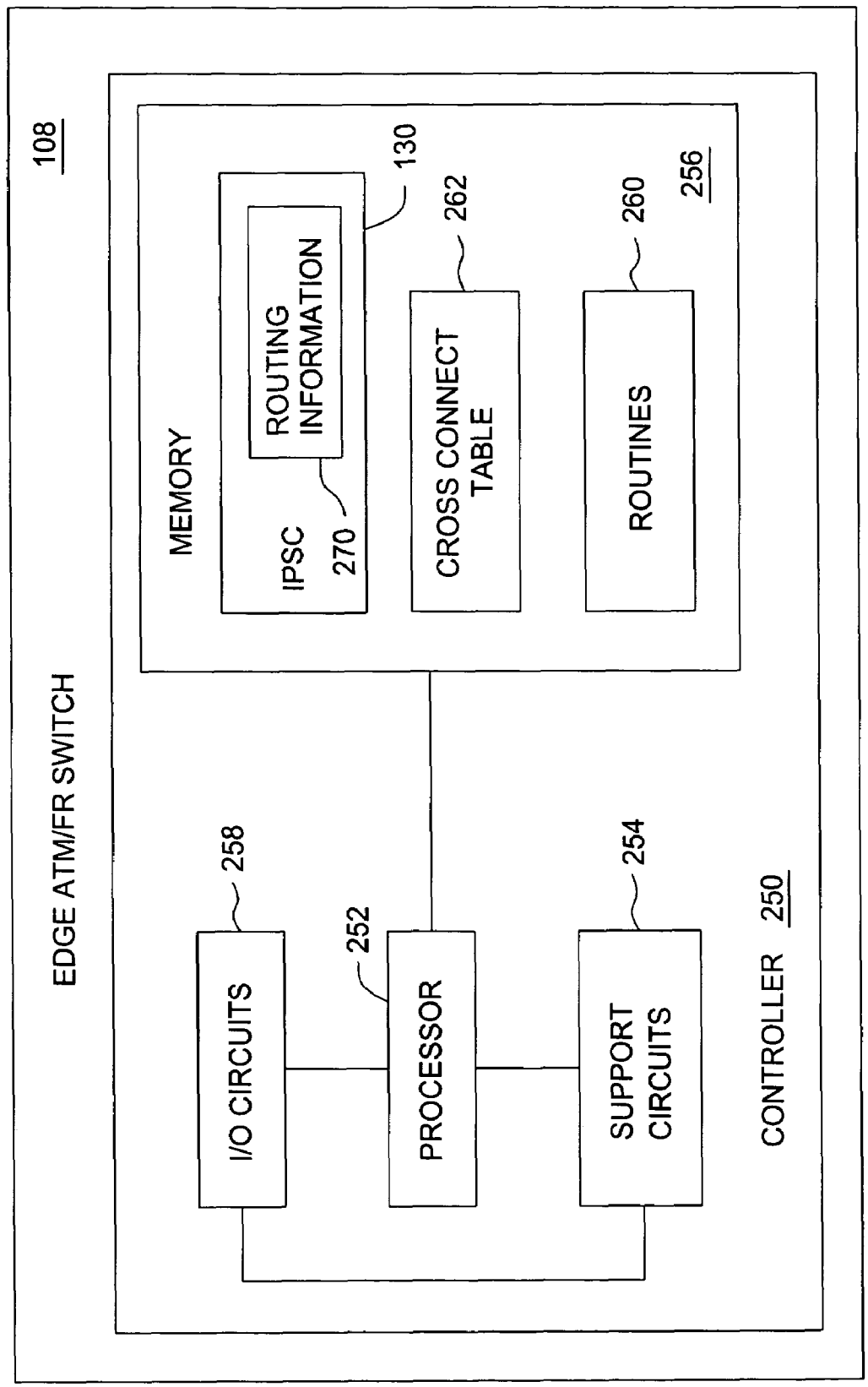
FIG. 2 depicts a high-level block diagram of an exemplary edge device suitable for use in the VPN network of FIG. 1.

FIG. 2 depicts a high-level block diagram of an exemplary edge device 108 suitable for use in the network of FIG. 1. The edge device 108 comprises a controller 250 that is suitable for use in the implementation of the present invention. Although the exemplary controller 250 is shown as being installed in an edge server 108, such controller 250 (with the IPSC 130) may be installed on a controller board located in server 128, as shown in FIG. 1.

Specifically, the controller 250 comprises a processor 252, support circuits 254, I/O circuitry 258, as well as memory 256 for storing various control programs 258 and the IPSC 130 of the present invention. The memory 256 may be volatile memory, such as DRAM, SRAM, or any other type of volatile memory, non-volatile memory, such as one or more disk drives, among others, or a combination of volatile and non-volatile memory. The I/O circuits 258 are coupled to the processor 252 and support circuits 254 for transferring information between the controller 250 and other circuitry in the edge switch 108 (or server 128), or external to the switch/server 108/128.

The processor 252 cooperates with conventional support circuitry 254 such as power supplies, clock circuits, cache memory and the like, as well as circuits that assist in executing the software routines 260 stored in the memory 256. As such, it is contemplated that some of the process steps discussed herein as software processes may be implemented within hardware, for example as circuitry that cooperates with the processor 252 to perform various steps. Further, a cross-connect table 262 is provided in memory 256 to provide connectivity information between the switches 108 to perform virtual circuit switching illustratively along virtual circuit paths 110, as is conventionally known in the art.

Although the controller 250 of FIG. 2 is depicted as a general-purpose computer that is programmed to perform various control functions in accordance with the present invention, the invention can be implemented in hardware as, for example, an application specific integrated circuit (ASIC). As such, it is intended that the processes described herein, be broadly interpreted as being equivalently performed by software, hardware, or a combination thereof.

In the prior art, the customer edge devices 122 exchange routing information over the virtual circuits 110. However, as mentioned above, the present invention pushes the routing control and management from the customer edge devices 122 to the service provider's edge devices 108. Accordingly, a connection between each CE device 122 and the IPSC 130 is utilized to provide such routing control and management from the customer edge devices 122 to the service provider's edge devices 108.

Specifically, a separate control virtual circuit (VC) 124 is utilized between the CE 122 and the IPSC 130 of the respective edge switch 108 to exchange CE to CE reachability (i.e., addresses), as well as provide control information. The separate control VC 124 is illustratively an ATM/FR out-of-band (OOB) circuit path from the data carrying virtual circuits 110. That is, the OOB circuit path carries control (i.e., routing) information between a customer edge device 122 and the IPSC 130, as opposed to distributing data packets between the customer edge devices 122. A CE device 122 advertises its loop-back address (i.e., a unique IP address over the OOB control virtual circuit 124, where the IPSC 130 stores the CE loop-back information in the routing databases (tables) 308. It is noted that the physical layer for providing the data virtual circuits 110 and control virtual circuits 124 between the CEs 122 and switches 108 or servers 128 hosting the IPSCs 130 may be a commonly shared Ti connection, among other conventionally known physical mediums.

In one embodiment, monitoring of the data VC circuits 110 is provided. Such monitoring of the data VC circuits 110 is performed using a link level procedure, such as heartbeats, keep alive, among other conventional monitoring techniques known in the art.

The IPSCs 130 of each edge switch 108 advertise the routes to each other utilizing a routing protocol, such as Border Gateway protocol with Multi-Protocol extensions (MP-BGP), as specified under RFC 2858 by the IETF (Internet Engineering Task Force), which is incorporated by reference herein in its entirety. The MP-BGP communications between the IPSCs 130 allow the IPSCs 130 to exchange routes (i.e., prefixes) obtained from the CE devices 122 in a transformed format that allows the same IP addresses within different VPNs to be resolved accordingly.

Referring to FIG. 1, the routing protocol is illustratively sent over path 112 between the IPSC$_1$ 130$_1$ at the first edge switch 108, and the IPSC$_2$ located at the server 128. It is noted that the path 112 may illustratively be formed through virtual circuits between the ATM/FR switches (i.e., the core network 106) or illustratively via Ethernet connections, in an instance where the IPSC 130 is hosted in a server 128.

Figure 3:
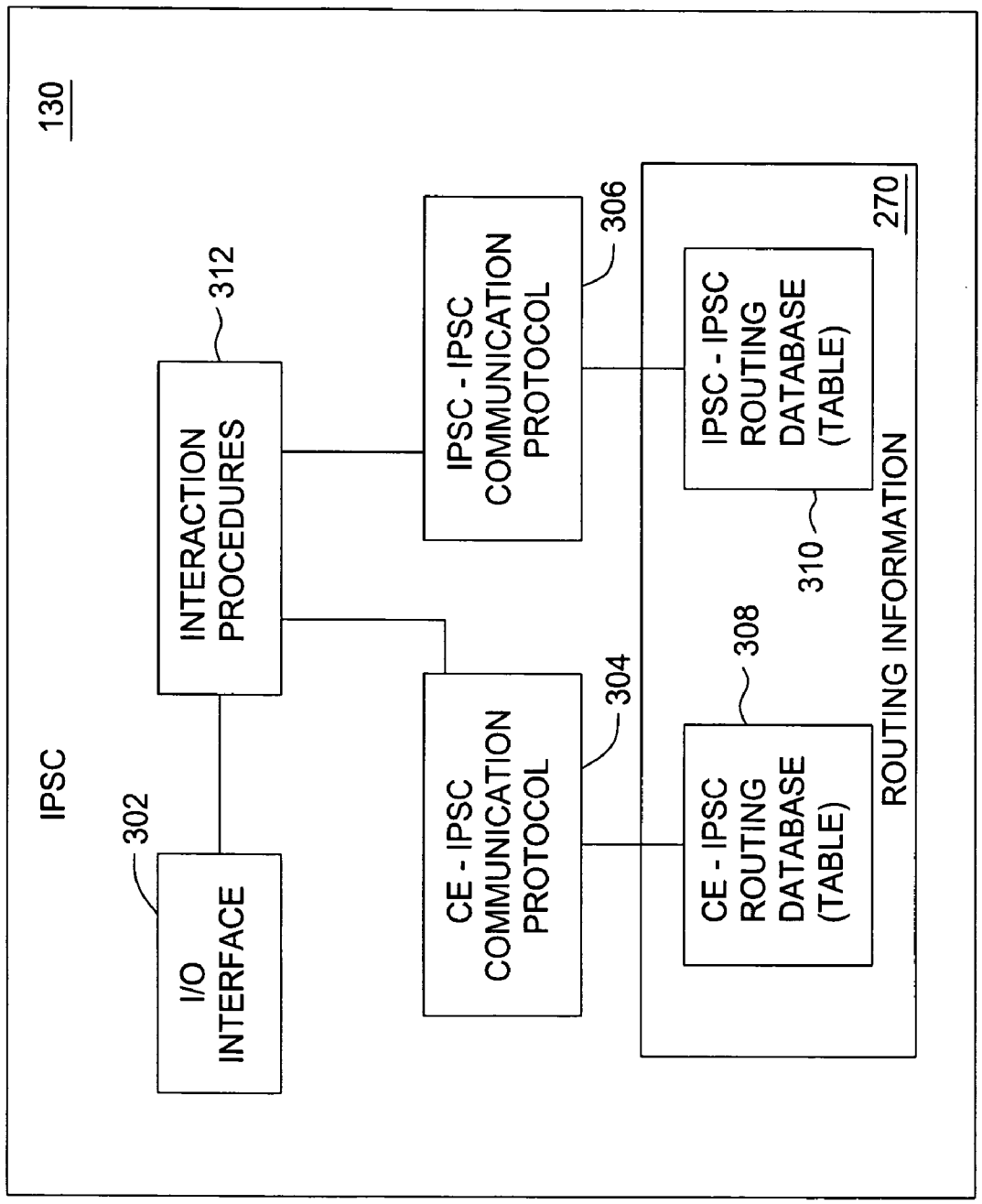
FIG. 3 depicts a high-level block diagram of an IP service control (IPSC) of the present invention.

FIG. 3 depicts a high-level block diagram of an IP service control (IPSC) 130 of the present invention. That is, FIG. 3 depicts a block diagram illustrating the functional aspects of the IPSC of the present invention. The IPSC module 130 may be written in any software program capable of high-speed communications, such as C, C++, Pearl, Java, among others.

In particular, each IPSC 130 comprises at least one physical I/O interface 302, a CE-IPSC communications protocol 304, an IPSC-IPSC communications protocol 306, the routing information 270, which includes a CE-IPSC routing database (table) 308 and an IPSC-IPSC routing database (table) 310, and interaction procedures 312.

The I/O interfaces 302 provide physical connectivity to establish the control virtual circuits 124 between the CEs 122 and IPSCs 130, as well as the routing control mp-iBGP path 112 between the IPSCs 130. The CE-IPSC communication protocol 304 provides the BGP routing procedures for the control virtual circuits 124 between the CE 122 and IPSC 130, while the IPSC-IPSC communication protocol 306 provides the mp-iBGP routing procedures for the routing protocol path 112 between the IPSCs 130. The CE-IPSC routing database 308 and an IPSC-IPSC routing database 310 respectively store routing information for the control virtual circuits 124 and mp-iBGP routing protocol paths 112. The interaction procedures 312 utilize the information in the IPSC-IPSC routing database 310, in conjunction with the CE-IPSC protocol information 304 and I/O interfaces 302, to determine routing information to be sent to the CEs 122 and the IPSCs 130.

Figure 4A:
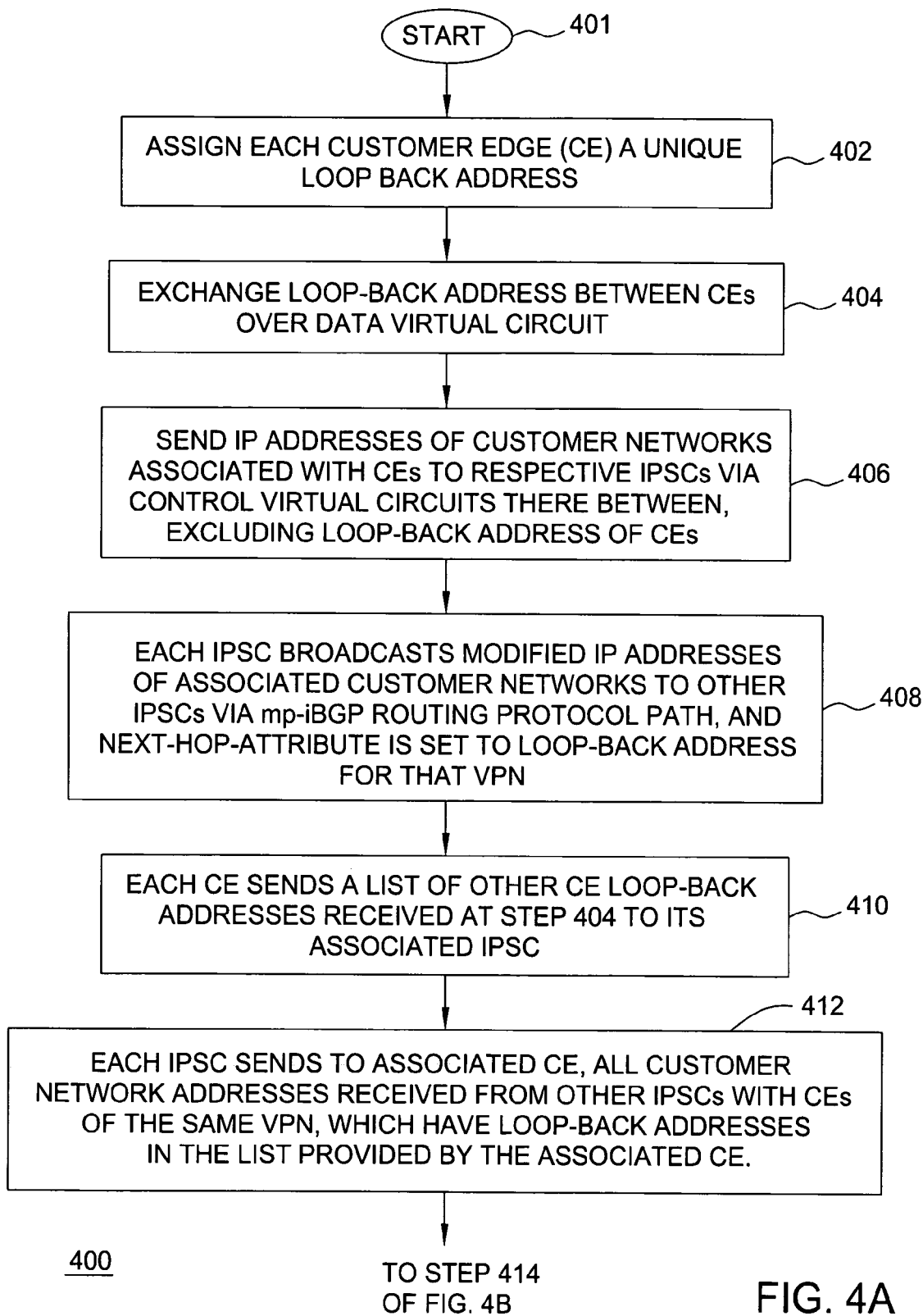
FIGS. 4A and 4B collectively depict a flow diagram of a method of routing IP packets across the VPN network of FIG. 1.
Figure 4B:
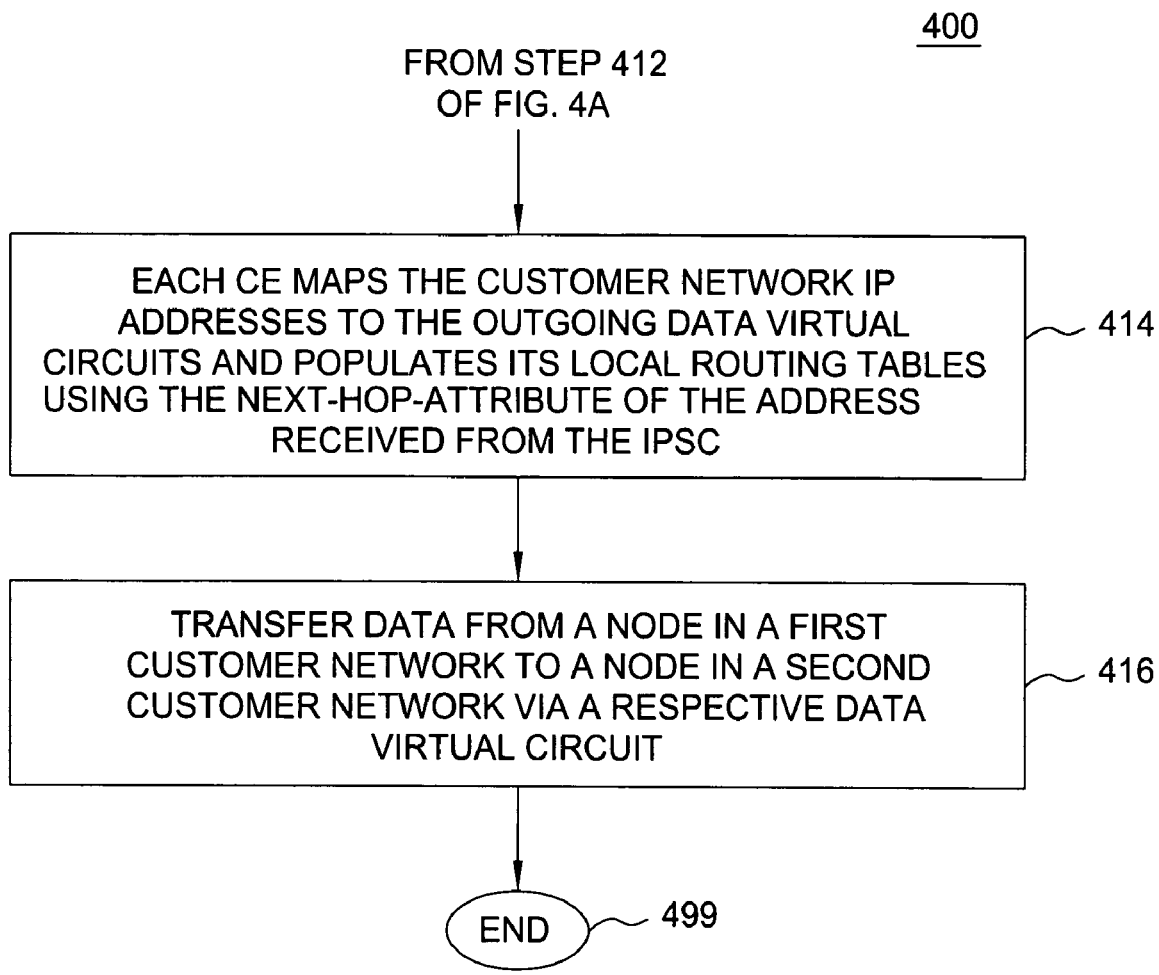
Figure 5:
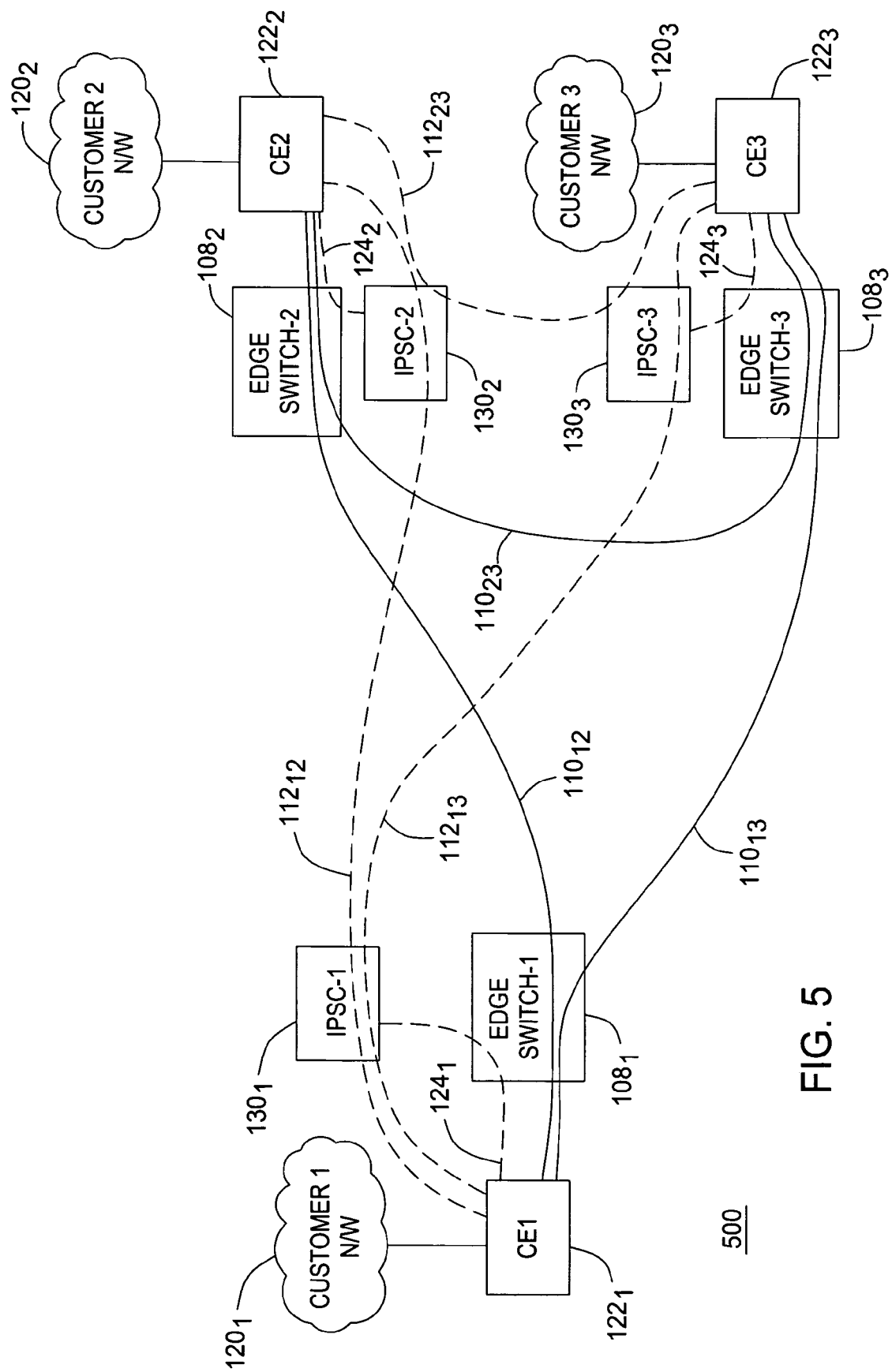
FIG. 5 depicts a schematic diagram of a second exemplary network suitable for implementing the present invention.

FIGS. 4A and 4B collectively depict a flow diagram of a method 400 of routing IP packets across the exemplary network of FIG. 1. FIG. 5 depicts a schematic diagram of a second exemplary network 500 suitable for implementing the present invention. FIG. 5 is the same as FIG. 1, except that a full mesh network 500 is provided, as opposed to a partial mesh network depicted in FIG. 1. For purposes of better understanding the invention, FIG. 5 should be viewed in conjunction with FIG. 4.

Referring to FIG. 5, the network 500 illustratively comprises a first customer edge router CE1 $122_1$ coupled to a first customer network $120_1$, a respective first edge switch $108_1$, and a respective first IPSC-1 $130_1$. The network 500 further comprises a second customer edge router CE2 $122_2$ coupled to a second customer network $120_2$, a respective second edge switch $108_2$, and a respective second IPSC-2 $130_2$, as well as a third customer edge router CE3 $122_3$ coupled to a third customer network $120_3$, a respective third edge switch $108_3$, and a respective third IPSC-3 $130_3$.

In the exemplary full mesh network 500, the first CE1 $122_1$ is coupled, via the first switch $108_1$, to the second and third CEs $122_2$ and $122_3$ via respective data virtual circuits $110_{12}$ and $110_{13}$. Similarly, the second CE2 $122_2$ is coupled, via the second switch $108_2$, to the third CE3 $122_2$ via data virtual circuit $110_{23}$. It is noted that the third CE3 $122_3$ is coupled to the other CEs $122_1$ and $122_2$ via the third switch $108_3$. The first CE1 $122_1$ is coupled to the first IPSC-1 $130_1$ via control virtual circuit $124_1$, the second CE2 $122_2$ is coupled to the second IPSC-2 $130_2$ via control virtual circuit $124_2$, and third CE3 $122_3$ is coupled to the third IPSC-3 $130_3$ via control virtual circuit $124_3$.

The first CE1 $122_1$ is also coupled to the second CE2 $122_2$ over an mp-iBGP routing protocol path $112_{12}$, via their respective IPSCs $130_1$ and $130_2$. Likewise, the first CE1 $122_1$ is coupled to the third CE3 $122_3$ over an mp-iBGP routing protocol path $112_{13}$, via their respective IPSCs $130_1$ and $130_3$. Furthermore, the second CE2 $122_2$ is coupled to the third CE3 $122_3$ over an mp-iBGP routing protocol path $112_{23}$, via their respective IPSCs $130_2$ and $130_3$, thereby forming the exemplary full mesh network 500.

Referring to FIG. 4A, the method 400 starts at step 401, and proceeds to step 402, where each CE device 122 is assigned a unique loop-back address (e.g., RD=0). At step 404, the CE devices 122 exchange their respective loop-back address via the data virtual circuits 110 therebetween. For example, CE2 $122_2$ sends its loop-back address to the second switch $108_2$ for forwarding the loop-back address to the first CE1 $122_1$ and the second CE2 $122_2$ respectively over data virtual circuits $110_{21}$ and $110_{21}$, via switches $108_1$ and $108_3$.

At step 406, each CE 122 sends the IP addresses of the customer network 120 associated with the CE 122 to the respective IPSC 130, via control virtual circuit 124. For example, CE1 $122_1$ sends the IP addresses of its associated customer network $120_1$ to the first IPSC-1 $130_1$ via control virtual circuit $124_1$, CE2 $122_2$ sends the IP addresses of its associated customer network $120_2$ to the second IPSC-2 $130_2$ via control virtual circuit $124_2$, and so forth. It is noted that in FIG. 5, the control virtual circuits 124 are illustratively shown passing through the respective switch 108 to the IPSC 130. However, one skilled in the art will appreciate that the IPSCs may be facilitated in a server 128, which is independent of the switch 108, as shown in FIG. 1. The method 400 then proceeds to step 408.

At step 408, the IPSCs 130 broadcast to the other IPSCs 130, the customer network addresses received from their respective CEs 122, as well as the VPN specific identifier (e.g., RD), and the BGP next hop attribute set to the loop-back address of the CE 122, to make the customer network addresses unique to the VPN. For example, first IPSC-1 $130_1$ sends the IP addresses of the first customer network $120_1$ to the second IPSC-2 $130_2$ and IPSC-3 $130_3$ respectively via mp-iBGM paths $112_{12}$ and $112_{13}$. Each of the IPSCs 130 sends the addresses of their associated customer networks 120 to the other IPSCs that they are connected to via paths 112 in the network. Thus, in a partial mesh network, an IPSC will forward the IP addresses of its associated customer network only to those IPSCs 130 the sending IPSC is coupled to via path 112 in the network.

At step 410, each CE 122 sends to its associated IPSC a list of loop-back addresses for the sites that the CE is directly connected. That is, for the exemplary full mesh network 500 of FIG. 5, each CE 122 sends a list of the loop-back addresses it received from the other CEs via the data virtual circuit paths 110 at step 404. It is noted that the CEs do not send their own loop-back address to the IPSCs 130. The method 400 then proceeds to step 412.

At step 412, each IPSC 130 sends to its associated CE, all customer network addresses received from the other CEs of the same VPN, which have loop-back addresses in the list provided by the originating CE at step 410. For example, in the full mesh network 500 of FIG. 5, first IPSC-1 $130_1$ sends to first CE1 $122_1$ the customer network addresses received from CE2 $122_2$ and CE3 $122_3$, second IPSC-2 $130_2$ sends to second CE2 $122_2$ the customer network addresses received from CE1 $122_1$ and CE3 $122_3$, and third IPSC-3 $130_3$ sends to third CE3 $122_3$ the customer network addresses received from CE1 $122_1$ and CE2 $122_1$.

At step 414, each CE 122 maps the received customer network IP addresses to the outgoing data virtual circuits 110, as well as populates its local routing tables with the mapped information. At step 416, a user operating a node in a first customer network (e.g., third customer network $120_3$) may transfer data packets to a user operating a node at a second customer network (e.g., second customer network $120_2$) via data virtual circuit $110_{23}$. The method 400 then proceeds to step 418 where the method 400 ends.

The IP service controller (IPSC) 130 of the present invention enables frame relay, ATM, or any layer-2 (L2) service providers (including IP tunnels) to offer BGP/MPLS-like managed VPN services. Such services do not require the service provider or customers to install/upgrade their deployed equipment with L3 edge devices. Rather, the IPSC 130 may be implemented on a controller card of a provider edge device (switch) or on a separate server, where appropriate. Accordingly, the implementation of the IPSCs of the present invention enable a service provider to provide IP-VPN services for customers and service providers utilizing layer-2 point-to-point connectivity, such as ATM, frame relay, and the like, in a cost effective manner.

Although various embodiments that incorporate the teachings of the present invention have been shown and described in detail herein, those skilled in the art can readily devise many other varied embodiments that still incorporate these teachings.

What is claimed is:

1. A method for providing Internet Protocol (IP) Virtual Private Network (VPN) services, comprising:
   exchanging unique loop-back addresses of customer edges (CE) between said CEs via a respective data virtual circuit therebetween;
   sending IP addresses of customer networks associated with each CE to an associated IP service controller (IPSC);
   broadcasting from said associated IPSC, said IP addresses of said associated customer networks to other IPSCs;
   sending, from each CE to an associated IPSC, a list of received loop-back addresses;
   sending, from each IPSC to an associated CE, customer network addresses received from other IPSCs; and
   populating, at each CE, a local routing table with information mapping said customer networks with a data virtual circuit.

2. The method of claim 1, wherein prior to said sending said IP addresses of customer networks, said method further comprises:
   assigning a unique loop-back addresses to each CE.

3. The method of claim 2, wherein said loop-back addresses comprise an IP address.

4. The method of claim 1, wherein said sending IP addresses of customer networks associated with each CE to an associated IPSC further comprises excluding a loop-back address of said sending CE.

5. The method of claim 1, wherein said sending IP addresses of customer networks to an IPSC are sent over an out-of-band control virtual circuit.

6. The method of claim 1, wherein said broadcasting said IP addresses to other IPSCs comprises distributing said IP addresses over an Border gateway Protocol with Multi-Protocol extensions (mp-BGP) routing protocol path.

7. The method of claim 1, wherein said broadcasting from said associated IPSC to other IPSCs further comprises broadcasting a VPN specific identifier and a next-hop-attribute set to the loop-back address of said CE associated with said IPSC.

8. The method of claim 1, wherein said sending, from each IPSC to an associated CE, customer network addresses received from other IPSCs comprises sending those customer network addresses that have loop-back addresses in said list provided by the associated CEs.

9. Apparatus for providing Internet Protocol (IP) Virtual Private Network (VPN) services, comprising:
   means for exchanging unique loop-back addresses of customer edges (CE) between said CEs via a respective data virtual circuit therebetween;
   means for sending IP addresses of customer networks associated with each CE to an associated IP service controller (IPSC);
   means for broadcasting from said associated IPSC, said IP addresses of said associated customer networks to other IPSCs;

means for sending, from each CE to an associated IPSC, a list of received loop-back addresses;

means for sending, from each IPSC to an associated CE, customer network addresses received from other IPSCs; and means for populating, at each CE, a local routing table with information mapping said customer networks with a data virtual circuit.

10. The apparatus of claim 9, wherein said means for sending said IP addresses of customer networks, said apparatus further comprises:

means for assigning a unique loop-back addresses to each CE prior to said sending said IP addresses.

11. The apparatus of claim 10, wherein said loop-back addresses comprise an IP address.

12. The apparatus of claim 9, means for sending IP addresses of customer networks associated with each CE to an associated IPSC further comprises means for excluding a loop-back address of said sending CE.

13. The apparatus of claim 9, wherein said means for sending IP addresses of customer networks to an IPSC are sent over an out-of-band control virtual circuit.

14. The apparatus of claim 9, wherein said means for broadcasting said IP addresses to other IPSCs comprises distributing said IP addresses over an Border gateway Protocol with Multi-Protocol extensions (mp-BGP) routing protocol path.

15. The apparatus of claim 9, wherein said means for broadcasting from said associated IPSC to other IPSCs further comprises means for broadcasting a VPN specific identifier and a next-hop-attribute set to the loop-back address of said CE associated with said IPSC.

16. The apparatus of claim 9, wherein said means for sending, from each IPSC to an associated CE, customer network addresses received from other IPSCs comprises means for sending those customer network addresses that have loop-back addresses in said list provided by the associated CEs.

17. The apparatus of claim 9, wherein said IPSCs are facilitated in one of a switch and a server.

18. The apparatus of claim 17, wherein each said IPSC comprises:

I/O interface means for providing physical connectivity to establish control virtual circuits between the CEs and associated IPSCs, and a routing control mp-iBGP path between said IPSCs;

a CE-IPSC communication protocol for provides BGP routing procedures for the control virtual circuits between said CEs and associated IPSCs;

a IPSC-IPSC communication protocol for providing mp-iBGP routing procedures for the routing protocol path between said IPSCs;

a CE-IPSC routing database for storing routing information for the control virtual circuits;

an IPSC-IPSC routing database for storing mp-iBGP routing protocol paths; and means for providing interaction procedures between said I/O interface means, CE-IPSC communication protocol, IPSC-IPSC communication protocol, CE-IPSC routing database, and IPSC-IPSC routing database.

19. The apparatus of claim 18, wherein said means for providing interaction procedures utilize information in the IPSC-IPSC routing database, in conjunction with the CE-IPSC protocol information and I/O interfaces, to determine routing information to be sent to the CEs and the associated IPSCs.

20. A method for providing Internet Protocol (IP) Virtual Private Network (VPN) services, comprising:

receiving, at a customer edge (CE), unique loop-back addresses of other customer edges (CEs) via a respective data virtual circuit therebetween;

sending IP addresses of customer networks associated with said CE to an associated IP service controller (IPSC);

broadcasting from said associated IPSC, said IP addresses of said associated customer networks to other IPSCs;

sending, from said CE to said associated IPSC, a list of received loop-back addresses;

sending, from said associated IPSC to said CE, customer network addresses received from other IPSCs; and populating a local routing table of said CE with information mapping said customer networks with a data virtual circuit.

21. The method of claim 20, wherein said sending IP addresses of customer networks associated with said CE to an IPSC further comprises excluding a loop-back address of said CE.

22. The method of claim 20, wherein said broadcasting said IP addresses to other IPSCs comprises distributing said IP addresses over an Border gateway Protocol with Multi-Protocol extensions (mp-BGP) routing protocol path.

23. The method of claim 20, wherein said broadcasting from said associated IPSC to other IPSCs further comprises broadcasting a VPN specific identifier and a next-hop-attribute set to the loop-back address of said CE associated with said IPSC.

24. A method for providing Internet Protocol (IP) Virtual Private Network (VPN) services, comprising:

exchanging unique loop-back addresses of customer edges (CE) between said CEs via a respective data virtual circuit therebetween;

receiving, at an IP service controller (IPSC) associated with a CE, IP addresses of customer networks associated with said CE;

broadcasting from said IPSC, said IP addresses of said associated customer networks to other IPSCs;

sending, from said associated CE to said IPSC, a list of received loop-back addresses;

sending, from said IPSC to an associated CE, customer network addresses received from other IPSCs; and populating a local routing table of said associated CE with information mapping said customer networks with a data virtual circuit.

25. The method of claim 24, wherein said sending IP addresses of customer networks associated with each CE to an associated IPSC further comprises excluding a loop-back address of said sending CE.

26. The method of claim 24, wherein said IPSC receives said IP addresses of customer networks associated with said CE from an out-of-band control virtual circuit.

27. The method of claim 24, wherein said broadcasting said IP addresses to other IPSCs comprises distributing said IP addresses over an Border gateway Protocol with Multi-Protocol extensions (mp-BGP) routing protocol path.

28. The method of claim 24, wherein said broadcasting from said IPSC to other IPSCs further comprises broadcasting a VPN specific identifier and a next-hop-attribute set to the loop-back address of said CE associated with said IPSC.

* * * * *